United States Patent
Yoneyama

[11] Patent Number: 6,078,435
[45] Date of Patent: Jun. 20, 2000

[54] ZOOM LENS SYSTEM

[75] Inventor: Shuji Yoneyama, Saitama, Japan

[73] Assignee: Asahi Kogaku Kogyo Kabushiki Kaisha, Tokyo, Japan

[21] Appl. No.: 09/199,813

[22] Filed: Nov. 25, 1998

[30] Foreign Application Priority Data

Nov. 26, 1997 [JP] Japan .................................. 9-324953

[51] Int. Cl.[7] .................................................. G02B 15/14
[52] U.S. Cl. ...................... 359/691; 359/681; 359/680; 359/683
[58] Field of Search ..................... 359/676, 680, 359/681, 683, 685, 691, 689, 686; 396/72

[56] References Cited

U.S. PATENT DOCUMENTS

| | | | |
|---|---|---|---|
| 4,168,110 | 9/1979 | Itoh | 350/184 |
| 4,413,887 | 11/1983 | Kimura | 350/426 |
| 4,474,436 | 10/1984 | Itoh | 350/426 |
| 4,484,799 | 11/1984 | Doi et al. | 350/426 |
| 4,726,667 | 2/1988 | Tachihara | 350/426 |
| 5,278,699 | 1/1994 | Ito et al. | 359/692 |
| 5,283,693 | 2/1994 | Kohno et al. | 359/691 |
| 5,331,464 | 7/1994 | Ito et al. | 359/691 |
| 5,424,871 | 6/1995 | Ito et al. | 359/689 |
| 5,485,314 | 1/1996 | Sato | 359/691 |
| 5,546,232 | 8/1996 | Hirakawa | 359/691 |
| 5,899,585 | 5/1999 | Ogawa | 396/72 |

FOREIGN PATENT DOCUMENTS

| | | |
|---|---|---|
| 60-55311 | 3/1985 | Japan . |
| 4114115 | 4/1992 | Japan . |

*Primary Examiner*—Georgia Epps
*Assistant Examiner*—David N. Spector
*Attorney, Agent, or Firm*—Greenblum & Bernstein, P.L.C.

[57] ABSTRACT

A zoom lens system having a negative first lens group and a positive second lens group in this order from the object, each of which is arranged to move for zooming; the first negative lens group including a first single positive lens element, a second single negative meniscus lens element having convex surface facing the object, a third single negative lens element and a fourth a positive single lens element having a convex surface facing the object, in this order from the object; the second positive lens group including a fifth a positive biconvex single lens element, a sixth positive single meniscus lens element having the convex surface facing the object, a seventh negative biconcave single lens element and an eighth positive single lens element, in this order from the object; and the following condition is satisfied:

$$(n_2+n_3)/Z<1.32 \qquad (1)$$

Wherein $n_i$ designates the refractive index of the i-th lens; Z designates the zoom ratio of the zoom lens system.

5 Claims, 9 Drawing Sheets

Fig. 1
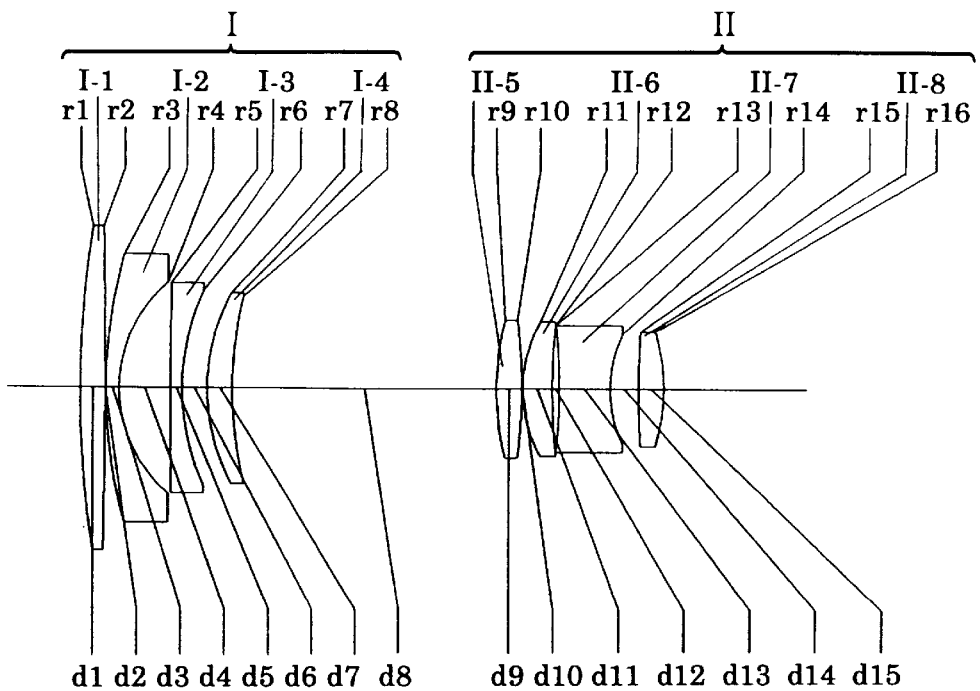
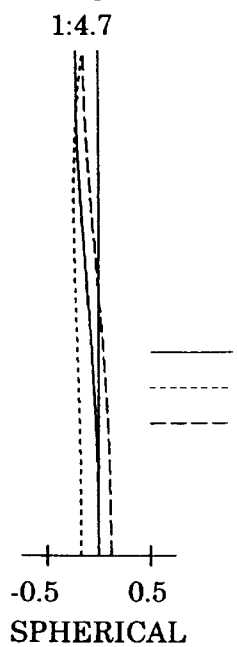
Fig. 2A
1:4.7
— d LINE
······ g LINE
--- C LINE
-0.5   0.5
SPHERICAL
ABERRATION
CHROMATIC
ABERRATION
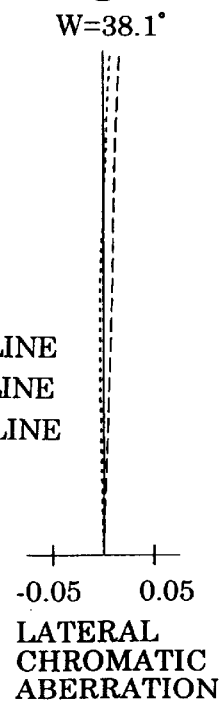
Fig. 2B
W=38.1°
-0.05   0.05
LATERAL
CHROMATIC
ABERRATION
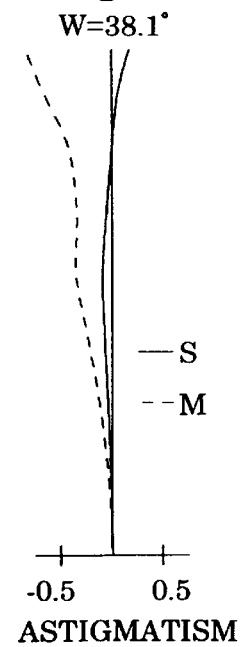
Fig. 2C
W=38.1°
— S
--- M
-0.5   0.5
ASTIGMATISM
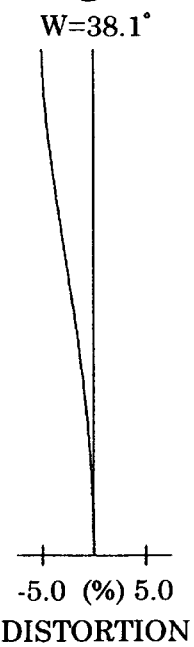
Fig. 2D
W=38.1°
-5.0 (%) 5.0
DISTORTION Fig.3A
1:5.4
Fig.3B
W=21.6°
Fig.3C
W=21.6°
Fig.3D
W=21.6°
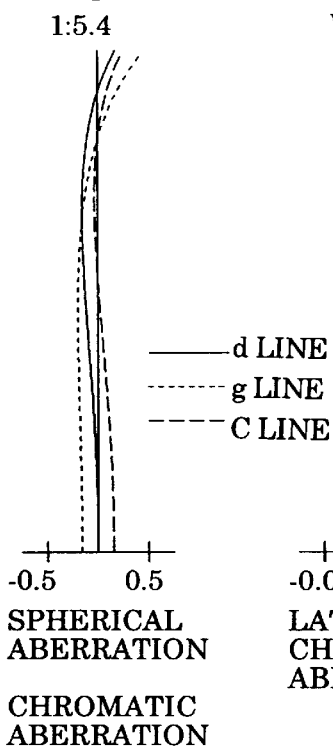
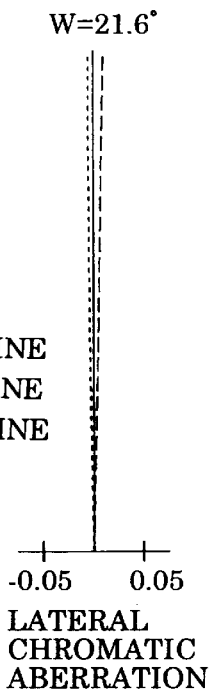
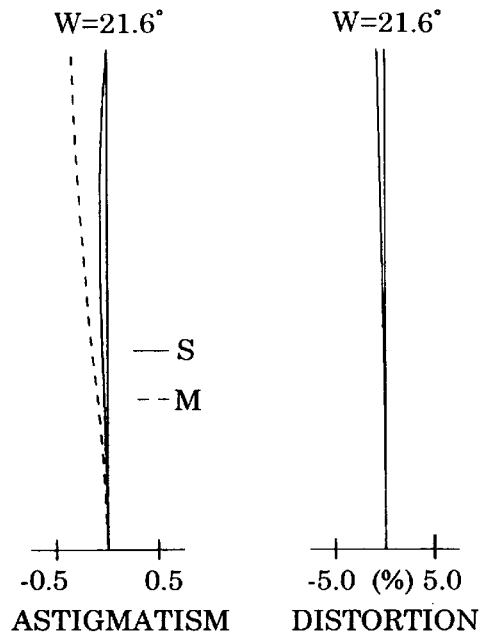
——— d LINE
········ g LINE
– – – C LINE
——— S
– – M
-0.5   0.5
SPHERICAL
ABERRATION
CHROMATIC
ABERRATION
-0.05   0.05
LATERAL
CHROMATIC
ABERRATION
-0.5   0.5
ASTIGMATISM
-5.0 (%) 5.0
DISTORTION
Fig.4A
1:5.8
Fig.4B
W=15.7°
Fig.4C
W=15.7°
Fig.4D
W=15.7°
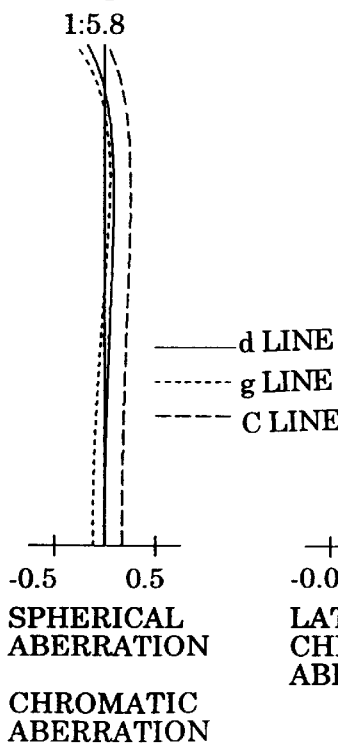
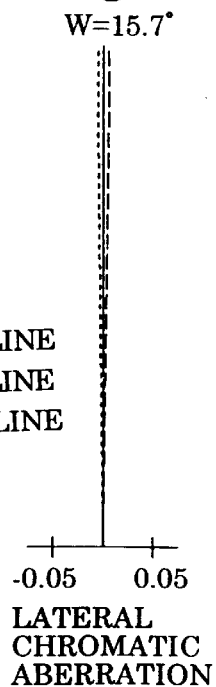
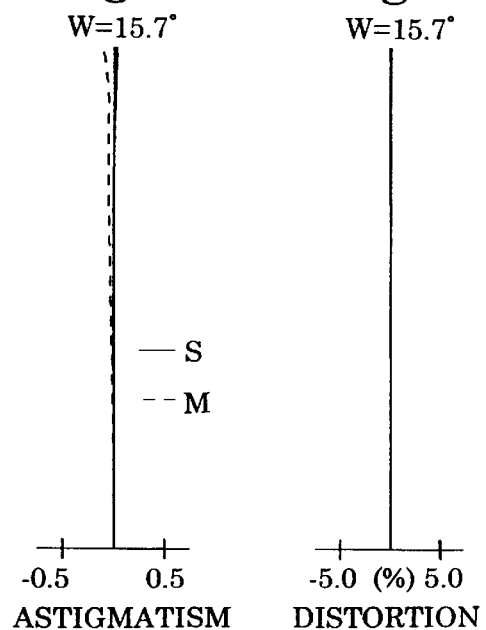
——— d LINE
········ g LINE
– – – C LINE
——— S
– – M
-0.5   0.5
SPHERICAL
ABERRATION
CHROMATIC
ABERRATION
-0.05   0.05
LATERAL
CHROMATIC
ABERRATION
-0.5   0.5
ASTIGMATISM
-5.0 (%) 5.0
DISTORTION Fig.5
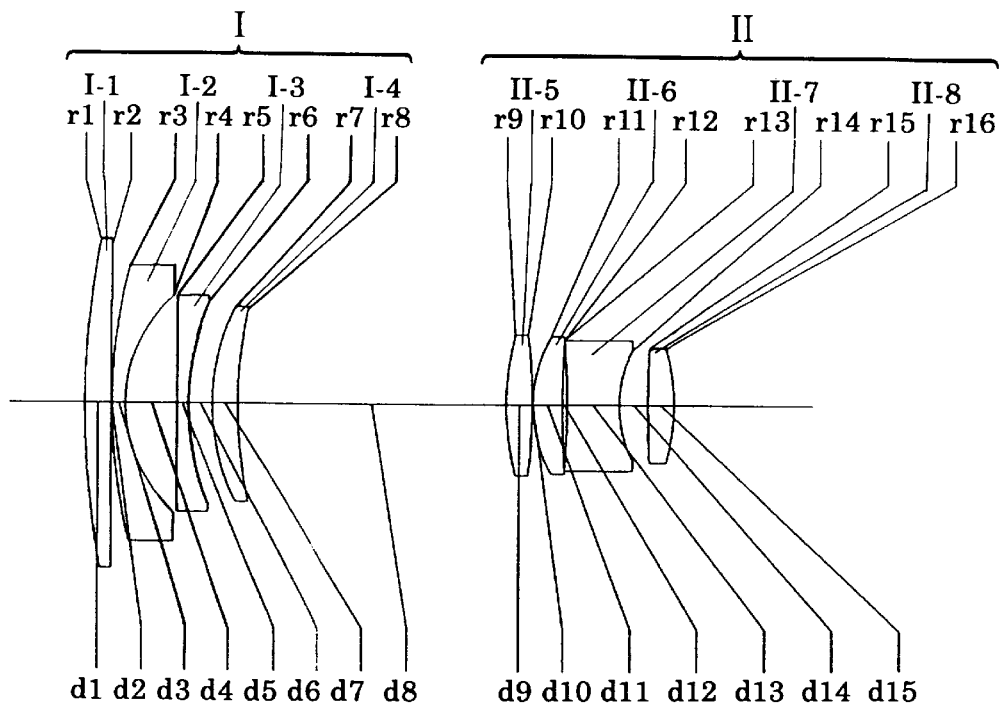
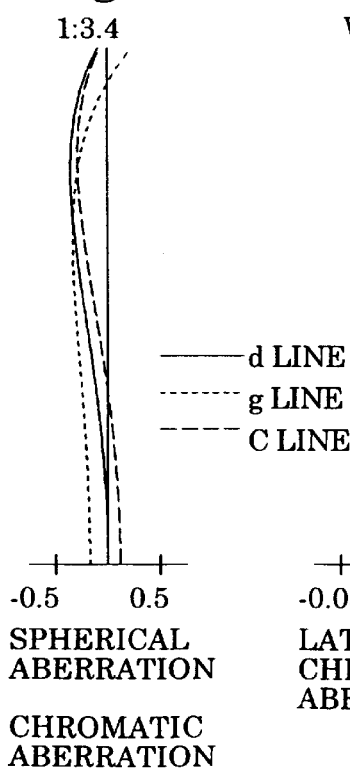
Fig.6A
1:3.4
-0.5  0.5
SPHERICAL
ABERRATION
CHROMATIC
ABERRATION
—— d LINE
······ g LINE
- - - C LINE
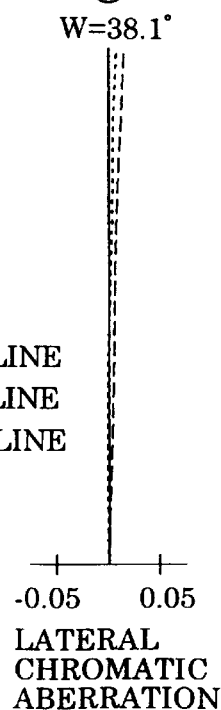
Fig.6B
W=38.1°
-0.05  0.05
LATERAL
CHROMATIC
ABERRATION
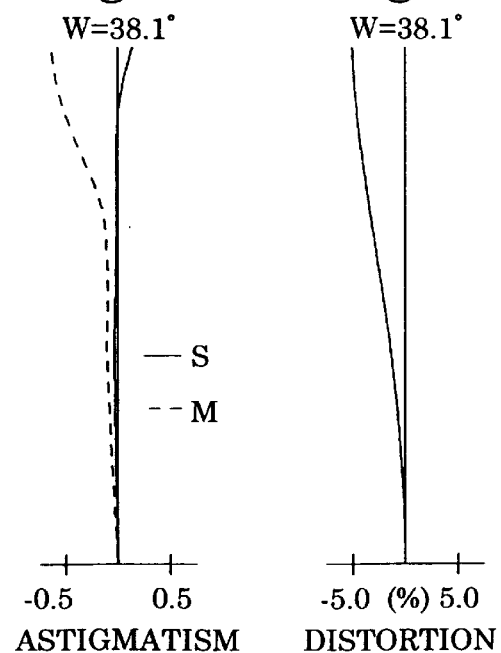
Fig.6C
W=38.1°
-0.5  0.5
ASTIGMATISM
—— S
- - M
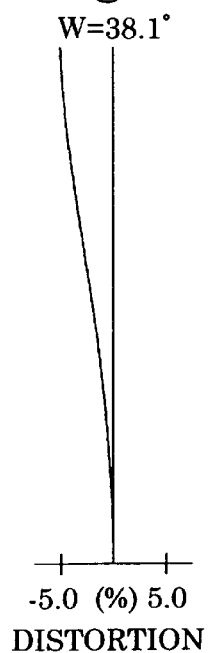
Fig.6D
W=38.1°
-5.0 (%) 5.0
DISTORTION

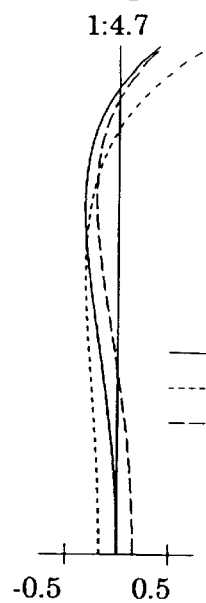
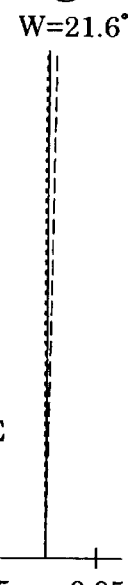
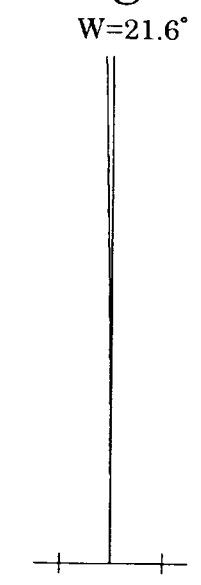
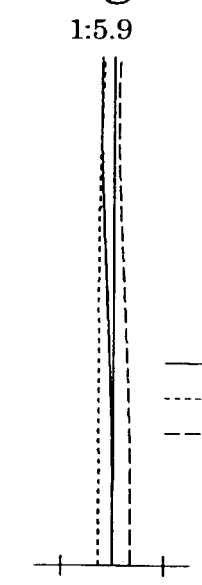
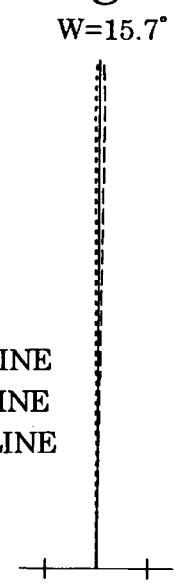
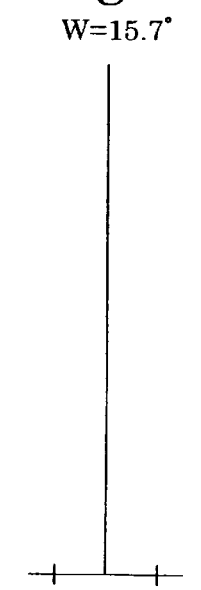

Fig.9
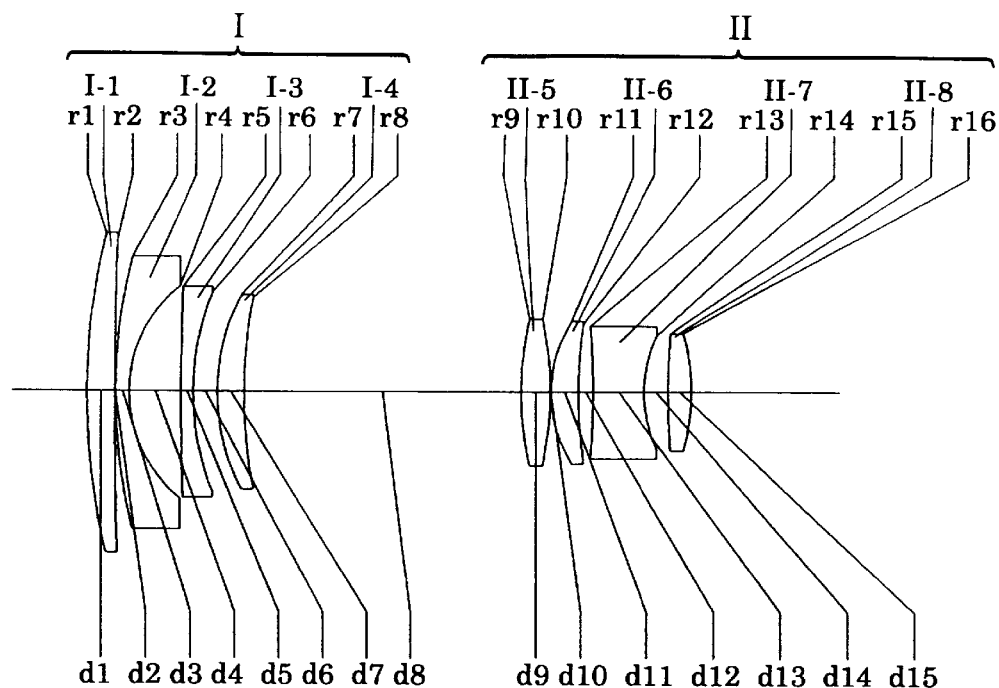
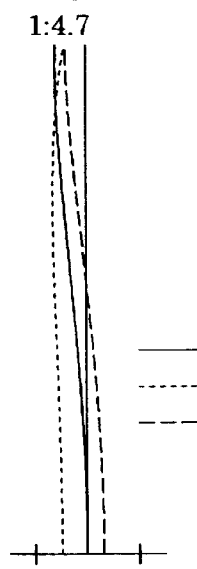
Fig.10A
1:4.7
—— d LINE
······ g LINE
---- C LINE
-0.5    0.5
SPHERICAL
ABERRATION
CHROMATIC
ABERRATION
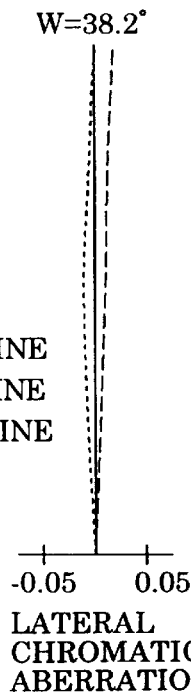
Fig.10B
W=38.2°
-0.05   0.05
LATERAL
CHROMATIC
ABERRATION
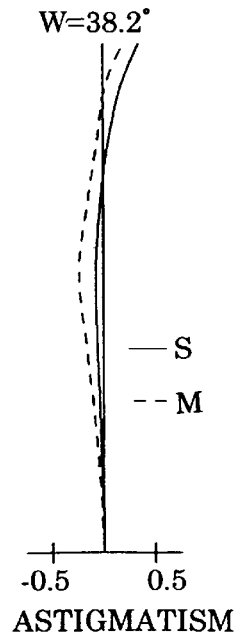
Fig.10C
W=38.2°
—— S
-- M
-0.5    0.5
ASTIGMATISM
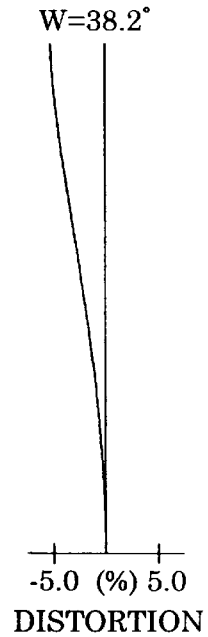
Fig.10D
W=38.2°
-5.0 (%) 5.0
DISTORTION

Fig.11A
1:5.4
Fig.11B
W=21.6°
Fig.11C
W=21.6°
Fig.11D
W=21.6°
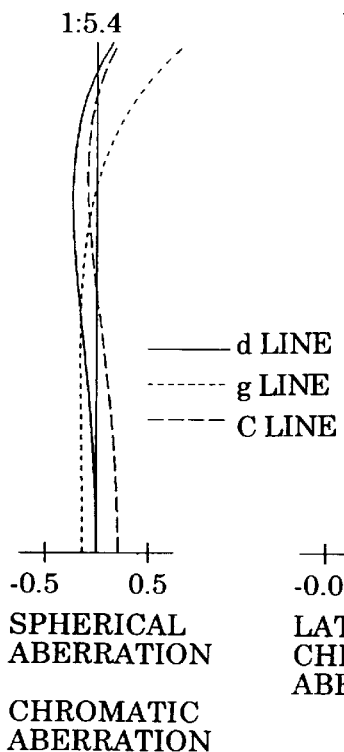
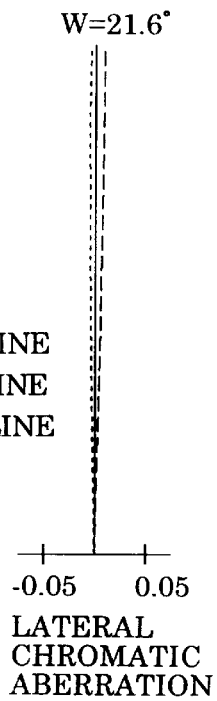
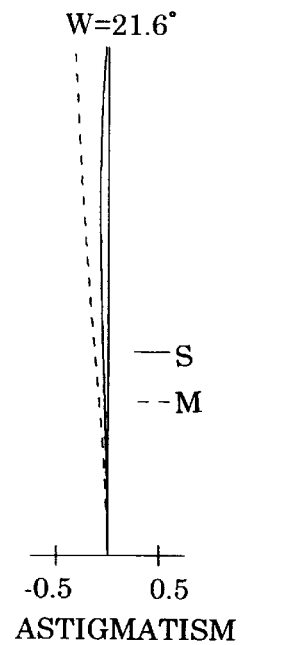
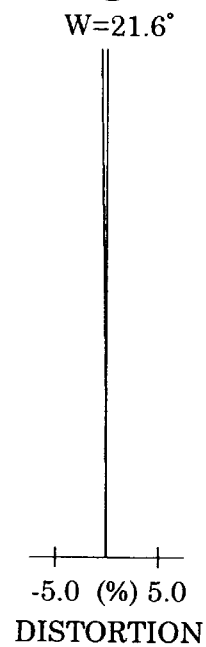
—— d LINE
------ g LINE
— — C LINE
— S
-- M
-0.5  0.5
SPHERICAL
ABERRATION
CHROMATIC
ABERRATION
-0.05  0.05
LATERAL
CHROMATIC
ABERRATION
-0.5  0.5
ASTIGMATISM
-5.0 (%) 5.0
DISTORTION
Fig.12A
1:5.9
Fig.12B
W=15.7°
Fig.12C
W=15.7°
Fig.12D
W=15.7°
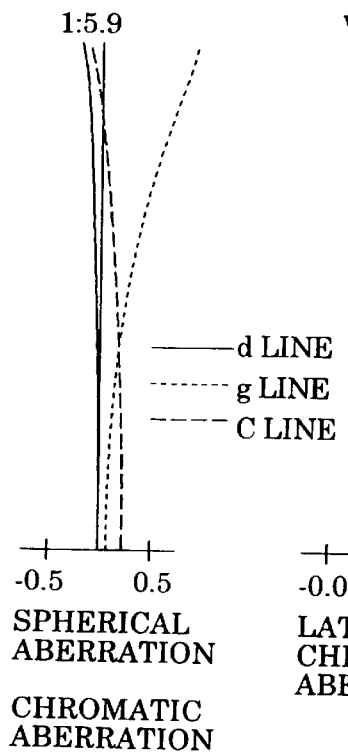
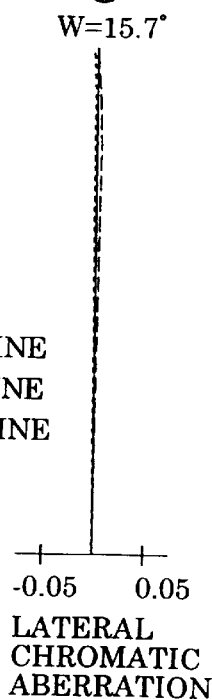
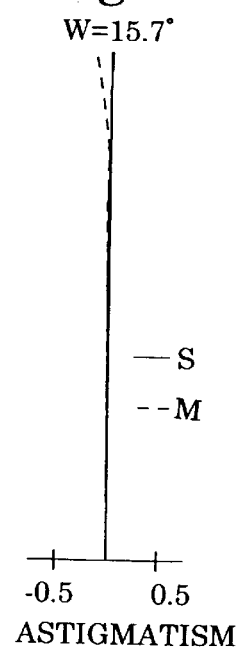
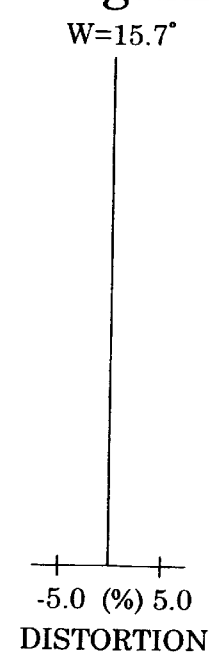
—— d LINE
------ g LINE
— — C LINE
— S
-- M
-0.5  0.5
SPHERICAL
ABERRATION
CHROMATIC
ABERRATION
-0.05  0.05
LATERAL
CHROMATIC
ABERRATION
-0.5  0.5
ASTIGMATISM
-5.0 (%) 5.0
DISTORTION 1:3.5
— d LINE
······ g LINE
- - - C LINE
-0.5   0.5
SPHERICAL
ABERRATION
CHROMATIC
ABERRATION

W=38.2°
-0.05   0.05
LATERAL
CHROMATIC
ABERRATION

W=38.2°
— S
- - M
-0.5   0.5
ASTIGMATISM

W=38.2°
-5.0 (%) 5.0
DISTORTION

1:4.8

— d LINE
---- g LINE
-- -- C LINE

-0.5  0.5
SPHERICAL
ABERRATION
CHROMATIC
ABERRATION

W=21.6°

-0.05  0.05
LATERAL
CHROMATIC
ABERRATION

W=21.6°

— S
-- M

-0.5  0.5
ASTIGMATISM

W=21.6°

-5.0 (%) 5.0
DISTORTION

1:6.0

— d LINE
---- g LINE
-- -- C LINE

-0.5  0.5
SPHERICAL
ABERRATION
CHROMATIC
ABERRATION

W=15.7°

-0.05  0.05
LATERAL
CHROMATIC
ABERRATION

W=15.7°

— S
-- M

-0.5  0.5
ASTIGMATISM

W=15.7°

-5.0 (%) 5.0
DISTORTION

ZOOM LENS SYSTEM

BACKGROUND OF THE INVENTION

1. Field of the Invention

The present invention relates to a zoom lens system for use in a photographic lens of a camera or the like.

2. Description of the Related Art

As a conventional zoom lens system having a wide-angle position where a half-angle-of-view is in general more than about 30°, a simple two-lens-group zoom lens system, which is composed of a negative lens group (the first lens group) and a positive lens group (the second lens group) in this order from the object, has been used. In particular, the zoom lens systems which are disclosed in Japanese Unexamined Publication No. 60-55311 and Japanese Unexamined Publication No. 4-114115 have mainly been developed for the purpose of cost-reduction. However, both of these zoom lens systems have employed a lens material having a high refractive index to form a negative lens element in the first lens group. It is known that lens materials having a high refractive index are in general expensive since various kinds of ingredients are mixed to attain high refractive index. The production cost of zoom lens systems has not yet been sufficiently reduced in the prior art.

SUMMARY OF THE INVENTION

The object of the present invention is to provide a two-lens-group zoom lens system having a zoom ratio of about 2.7, the ratio of which covers a zooming range from a wide-angle position with the half-angle-of-view of about 38° to the telephoto position; whereby the production cost of the zoom lens system can be reduced.

In order to achieve the above-mentioned object, according to the present invention, there is provided a zoom lens system having a negative first lens group and a positive second lens group in this order from the object, each lens group of which is arranged to move for zooming; the first negative lens group including a first lens element composed of a single positive lens element, a second lens element composed of a single negative meniscus lens element having convex surface facing the object, a third lens element composed of a single negative lens element and a fourth lens element composed of a positive single lens element having a convex surface facing the object, in this order from the object; the second positive lens group comprising a fifth lens element composed of a positive biconvex single lens element, a sixth lens element composed of a positive single meniscus lens element having the convex surface facing the object, a seventh lens element composed of a negative biconcave single lens element and an eighth lens element composed of a positive single lens element, in this order from the object; and the zoom lens system satisfying the following conditions:

$$(n_2+n_3)/Z<1.32 \tag{1}$$

wherein $n_i$ designates the refractive index of the i-th lens;

Z designates the zoom ratio of the zoom lens system; and

The zoom lens system preferably satisfies the following condition:

$$1.51<(n_5+n_6+n_8)/3<1.58 \tag{2}$$

wherein $n_i$ designates the refractive index of the i-th lens.

Furthermore, the zoom lens system preferably satisfies the following condition:

$$-0.8<m_{2W}<-0.68 \tag{3}$$

wherein $m_{2W}$ designates the lateral magnification of the second lens group at the short focal length extremity.

The present disclosure relates to subject matter contained in Japanese Patent Application No. 9-324953 (filed on Nov. 26, 1997) which is expressly incorporated herein by reference in its entirety.

BRIEF DESCRIPTION OF THE DRAWINGS

The invention will be discussed below in detail with reference to the accompanying drawings, in which:

FIG. 1 is a lens arrangement of the first embodiment according to the present invention at the long focal length extremity;

FIGS. 2A, 2B, 2C and 2D are aberration diagrams of the lens arrangement of FIG. 1 at the short focal length extremity;

FIGS. 3A, 3B, 3C and 3D are aberration diagrams of the lens arrangement of FIG. 1 at a medium focal-length position;

FIGS. 4A, 4B, 4C and 4D are aberration diagrams of the lens arrangement of FIG. 1 at the long focal length extremity;

FIG. 5 is a lens arrangement of the second embodiment according to the present invention at the long focal length extremity;

FIGS. 6A, 6B, 6C and 6D are aberration diagrams of the lens arrangement of FIG. 5 at the short focal length extremity;

FIGS. 7A, 7B, 7C and 7D are aberration diagrams of the lens arrangement of FIG. 5 at a medium focal-length position;

FIGS. 8A, 8B, 8C and 8D are aberration diagrams of the lens arrangement of FIG. 5 at the long focal length extremity;

FIG. 9 is a lens arrangement of the third embodiment according to the present invention at the long focal length extremity;

FIGS. 10A, 10B, 11C and 10D are aberration diagrams of the lens arrangement of FIG. 9 at the short focal-length extremity;

FIGS. 11A, 11B, 11C and 11D are aberration diagrams of the lens arrangement of FIG. 9 at a medium focal-length position;

FIGS. 12A, 12B, 12C and 12D are aberration diagrams of the lens arrangement of FIG. 9 at the long focal length extremity;

DESCRIPTION OF THE PREFERRED EMBODIMENTS

Figure 17:
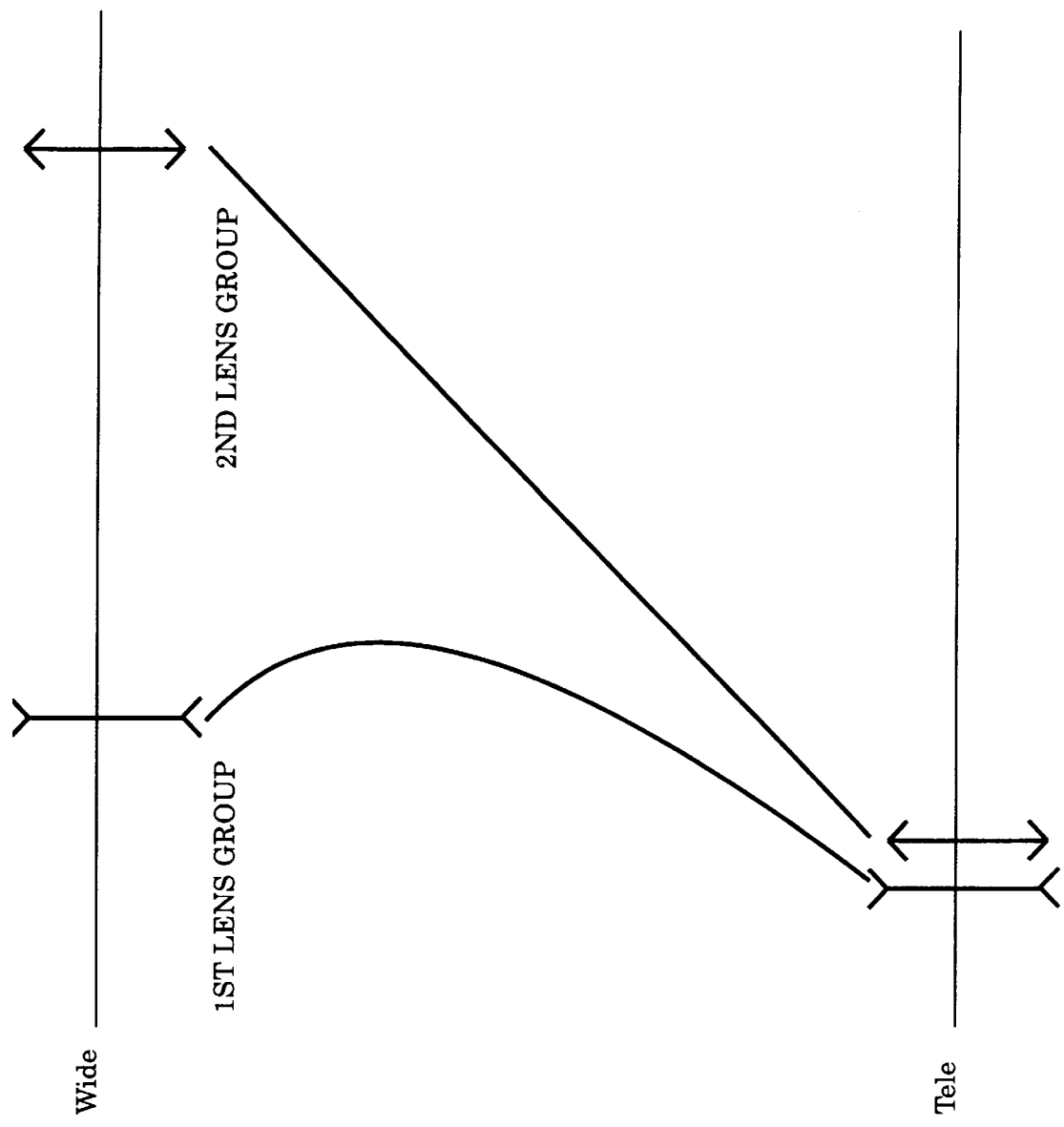
FIG. 17 is a diagram of the zoom paths the of the zoom lens system according to the present invention.

The zoom lens system of the present invention employs a two-lens-group lens system having a negative first lens group (I) and a positive second lens group (II) in this order from the object. FIG. 17 shows the zoom paths of the zoom lens system according to the present invention; and as it is understood from FIG. 17, the first lens group (I) and the second lens group (II) are arranged to start from predetermined initial points. In order to reduce the production cost of a zoom lens system covering a zoom range from the wide-angle position to a telephoto position, it is preferable to employ the simplest possible arrangement like the negative-positive two-lens-group zoom lens system as described above. The present invention attains a reduction of the production cost by choosing inexpensive lens materials for the above-mentioned negative-positive two-lens-group zoom lens system.

Condition (1) determines the refractive index of the negative lens elements (i.e., the second lens element and the third lens element) in the negative first lens group (I) and the zoom ratio (i.e., the focal length at the telephoto extremity/ the focal length at the wide-angle extremity).

The power of the negative lens elements in the first lens group (I), having negative power as a whole, are stronger than the power of the positive lens elements in the first lens group; and hence the negative lens elements have more influence in correcting aberrations. In such a case, it is easier to correct aberrations by utilizing high refractive lens material for the negative lens elements. Furthermore, it is preferable to employ low dispersive lens material for correcting chromatic aberrations. However, it is known that lens materials having a high refractive index and low dispersive power are expensive, and employing such materials is against the production cost reduction. Moreover, it is also known that the smaller the zoom ratio is, the less aberrations occur. In this respect, a low dispersive material could be used; however, it should be confirmed that the object of the present invention is to provide a zoom lens system with a high zooming ratio of about 2.7. Condition (1) is therefore provided to employ an inexpensive lens material of low refractive index while the zoom ratio of about 2.7 is maintained. Accordingly, an inexpensive lens material can be selected when a refractive index of the negative lens elements in the first lens group and the zoom ration satisfy Condition (1).

If a lens material of high refractive index is employed to the extent that $(n_2+n_3)/Z$ is higher than the upper limit, the cost reduction which is the object of the present invention and the high zoom ratio of about 2.7 are not achieved.

Condition (2) determines a mean value of the refractive indices of the positive lens elements (the fifth, sixth and eighth lens elements) in the positive second lens group (II). Since a material having a comparatively low refractive index has been selected to satisfy condition (1), the Petzval Sum of the first lens group is increased in the negative direction, and field curvature tends to occur in the positive direction. Then, if the refractive indices of the positive lens elements in the second lens group (II) are selected to satisfy condition (2), the Petzval Sum of the positive lens group increases in the positive direction, so that the Petzval Sum of the entire zoom lens system is balanced, and the image plane is flattened.

If $(n_5+n_6+n_8)/3$ is higher than the upper limit, the Petzval Sum of the positive second lens group does not increase in the positive direction. Consequently, it is difficult to balance the Petzval Sum of the entire second lens group, and flattening of the image plane cannot be attained.

If $(n_5+n_6+n_8)/3$ is lower than the lower limit, spherical and other aberrations increase, and correction thereof becomes difficult.

Condition (3) determines the lateral magnification of the second lens group (II) at the short focal length extremity.

If the lateral magnification of the second lens group (II) increases to the extent that $m_2W$ is higher than the upper limit, it is inevitable to increase the power of the first lens group (I). If the power of the first lens group (I) is strong, there is an advantage of being able to collect more marginal ray at the short focal length extremity; however, aberrations are not satisfactorily corrected because of spherical aberrations is over corrected, and astigmatism occurs.

If the lateral magnification of the second lens group (II) decreases to the extent that $m_{2W}$ is lower than the lower limit, a traveling distance of the second lens group due to zooming is longer, so that the fluctuation of the F-number of the entire zoom lens system determined by a position of the second lens group becomes extremely large, so that the lens system is not suitable for practical use. Furthermore, since a large spherical aberration in the negative direction occurs, if a lens material of low refractive index is selected so that the lens material satisfies condition (2), the correcting of aberrations becomes difficult.

Specific numerical data of the embodiments will be described below via the tables and diagrams; wherein $F_{NO}$ designates the F-number, f designates the focal length, W designates the half-angle-of-view, and $f_B$ designates the back focal distance. R designates the radius of curvature of each lens surface, D designates the lens thickness or distance, $N_d$ designates refractive index with respect to the d-line, $v_d$ designates the Abbe number. The d, g and c lines designate chromatic aberration, which are represented by spherical aberration at the respective wave length; and also the d, g and c lines designate lateral chromatic aberration. S designates the sagittal image, and M designates the meridional image.

[Embodiment 1]

FIGS. 1 through 4D show the first embodiment of the zoom lens system according to the present invention; FIG. 1 is a lens arrangement at the long focal length extremity. The zoom lens system is composed of a negative first lens group (I) and a positive second lens group (II) in this order from the object. The first lens group (I) includes, in order from the object, a first lens element I-1 composed of a positive single-lens element, a second lens element I-2 composed of a single negative meniscus lens element having a convex surface facing the object, a third lens element I-3 composed of a negative single lens element, and a fourth lens element I-4 composed of a positive single lens element having a convex surface facing the object side. The second lens group (II) includes, in order from the object, a fifth lens element II-5 composed of a positive biconvex single positive lens element, a sixth lens element II-6 composed of a single positive meniscus lens element having a convex surface facing the object, a seventh lens element II-7 which is a negative biconcave single lens element, and an eighth lens element II-8 composed of a positive single lens element. FIGS. 2A, 2B, 2C and 2D, FIGS. 3A, 3B, 3C and 3D and FIGS. 4A, 4B, 4C and 4D show aberration diagrams of the zoom lens system at the short focal length extremity, a medium focal-length position, and the long focal length extremity; Table 1 shows the numerical data.

TABLE 1

$F_{NO} = 4.7–5.4–5.8$
$f = 29.00–55.00–77.20$ (zoom ratio: 2.66)
$W = 38.1° –21.6° –15.7°$
$f_B = 47.51–71.61–92.19$

| Surface No. | R | D | $N_d$ | $v_d$ |
|---|---|---|---|---|
| 1 | 150.747 | 3.37 | 1.57501 | 41.5 |
| 2 | −1330.318 | 0.10 | — | — |
| 3 | 71.491 | 1.80 | 1.80610 | 40.9 |
| 4 | 19.643 | 7.00 | — | — |
| 5 | 842.201 | 1.60 | 1.51633 | 64.1 |
| 6 | 32.791 | 3.45 | — | — |
| 7 | 28.429 | 3.46 | 1.78472 | 25.7 |
| 8 | 56.927 | 36.41-10.88-2.70 | — | — |
| 9 | 40.976 | 3.50 | 1.62299 | 58.2 |
| 10 | −72.110 | 0.10 | — | — |
| 11 | 19.702 | 4.00 | 1.53172 | 48.9 |
| 12 | 92.495 | 0.97 | — | — |
| 13 | −95.389 | 7.00 | 1.71736 | 29.5 |
| 14 | 18.371 | 3.92 | — | — |
| 15 | 152.827 | 3.50 | 1.51633 | 64.1 |
| 16 | −27.405 | — | — | — |

[Embodiment 2]

FIGS. 5 through 8D show the second embodiment of the zoom lens system according to the present invention. FIG. 5 is a lens arrangement at the long focal length extremity; FIGS. 6A, 6B, 6C and 6D, FIGS. 7A, 7B, 7C and 7D and FIGS. 8A, 8B, 8C and 8D show aberration diagrams of the zoom lens system at the short focal length extremity, a medium focal-length position, and the long focal length extremity; Table 2 shows the numerical data thereof. The basic lens construction is the same as that of the first embodiment.

TABLE 2

$F_{NO} = 3.4–4.7–5.9$
$f = 29.00–55.00–77.20$ (zoom ratio: 2.66)
$W = 38.1° –21.6° –15.7°$
$f_B = 46.44–70.06–90.22$

| Surface No. | R | D | $N_d$ | $v_d$ |
|---|---|---|---|---|
| 1 | 120.732 | 3.52 | 1.57501 | 41.5 |
| 2 | 6072.068 | 0.10 | — | — |
| 3 | 74.525 | 1.80 | 1.80610 | 40.9 |
| 4 | 19.698 | 7.14 | — | — |
| 5 | −1323.476 | 1.60 | 1.51633 | 64.1 |
| 6 | 34.825 | 3.31 | — | — |
| 7 | 29.618 | 3.44 | 1.78472 | 25.7 |
| 8 | 62.443 | 36.06-10.80-2.70 | — | — |
| 9 | 38.665 | 3.50 | 1.62299 | 58.2 |
| 10 | −84.099 | 0.10 | — | — |
| 11 | 19.266 | 4.00 | 1.53172 | 48.9 |
| 12 | 130.704 | 0.65 | — | — |
| 13 | −116.615 | 7.00 | 1.71736 | 29.5 |
| 14 | 17.282 | 3.80 | — | — |
| 15 | 154.509 | 3.50 | 1.51633 | 64.1 |
| 16 | −29.124 | — | — | — |

[Embodiment 3]

FIGS. 9 through 12D show the third embodiment of the zoom lens system according to the present invention. FIG. 9 is a lens arrangement at the long focal length extremity; FIGS. 10A, 10B, 10C and 10D, FIGS. 11A, 11B, 11C and 11D and FIGS. 12A, 12B, 12C and 12D show aberration diagrams of the zoom lens system at the short focal length extremity, a medium focal-length position, and the long focal length extremity; Table 3 shows the numerical data. The basic lens construction is the same as that of the first embodiment.

TABLE 3

$F_{NO} = 4.7–5.4–6.0$
$f = 29.00–55.00–77.11$ (zoom ratio: 2.66)
$W = 38.2° –21.6° –15.7°$
$f_B = 47.88–72.68–93.78$

| Surface No. | R | D | $N_d$ | $v_d$ |
|---|---|---|---|---|
| 1 | 95.869 | 3.74 | 1.62096 | 35.9 |
| 2 | 787.176 | 0.10 | — | — |
| 3 | 78.962 | 1.80 | 1.80610 | 40.9 |
| 4 | 18.795 | 6.99 | — | — |
| 5 | 540.760 | 1.60 | 1.62299 | 58.2 |
| 6 | 36.380 | 3.29 | — | — |
| 7 | 28.778 | 3.64 | 1.74077 | 27.8 |
| 8 | 68.928 | 37.80-12.95-5.00 | — | — |
| 9 | 46.964 | 3.90 | 1.51633 | 64.1 |
| 10 | −46.964 | 0.10 | — | — |
| 11 | 18.657 | 3.65 | 1.59551 | 39.2 |
| 12 | 65.626 | 1.99 | — | — |
| 13 | −116.500 | 7.00 | 1.80518 | 25.4 |
| 14 | 18.746 | 3.21 | — | — |
| 15 | 119.287 | 3.10 | 1.56732 | 42.8 |
| 16 | −30.346 | — | — | — |

[Embodiment 4]

Figure 13:
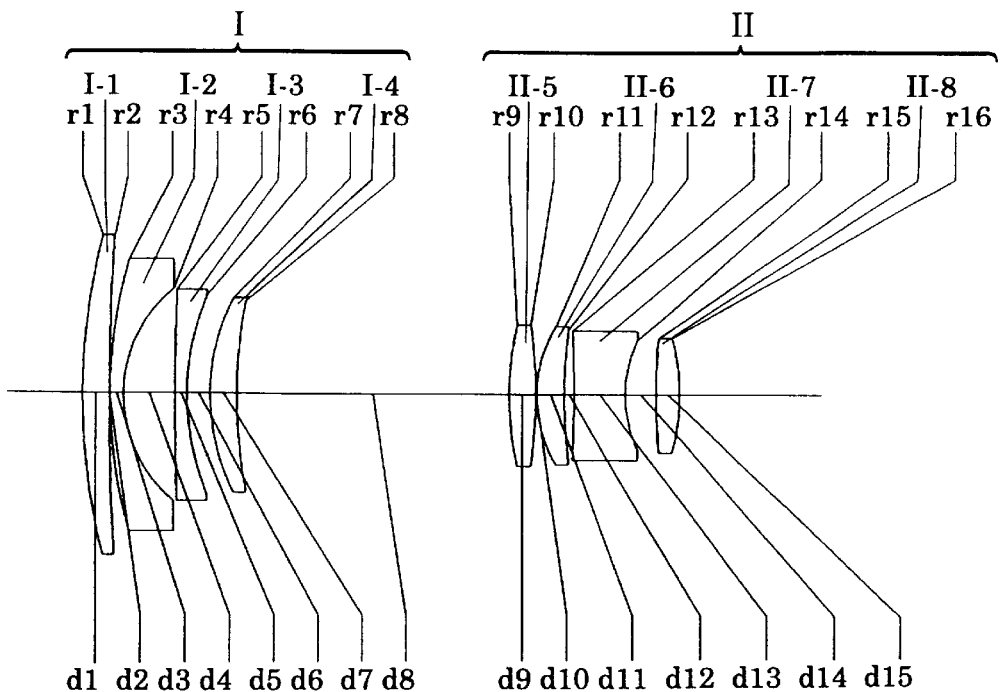
FIG. 13 is a lens arrangement of the fourth embodiment according to the present invention at the long focal length extremity.
Figure 14A:
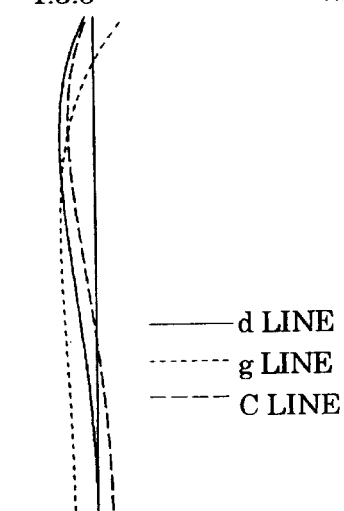
FIGS. 14A, 14B, 14C and 14D are aberration diagrams of the lens arrangement of FIG. 13 at the short focal length extremity.
Figure 14B:
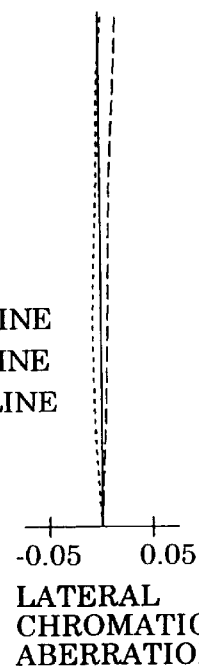
Figure 14C:
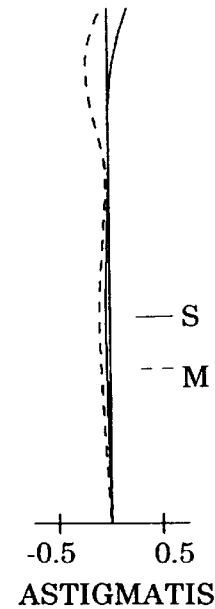
Figure 14D:
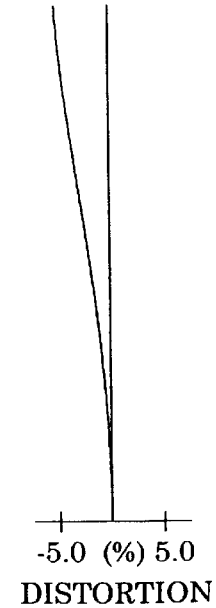
Figure 15A:
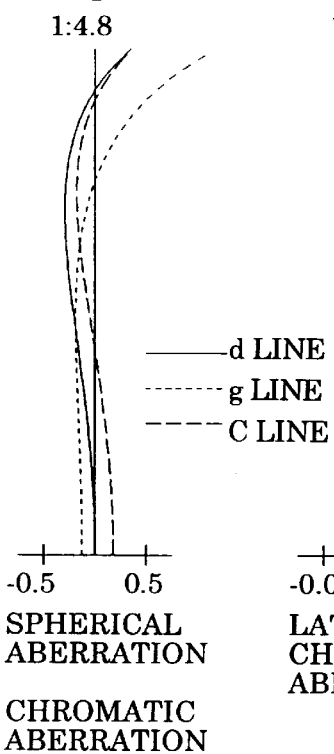
FIGS. 15A, 15B, 15C and 15D are aberration diagrams of the lens arrangement of FIG. 13 at a medium focal-length position.
Figure 15B:
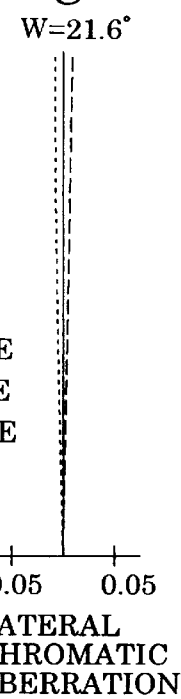
Figure 15C:
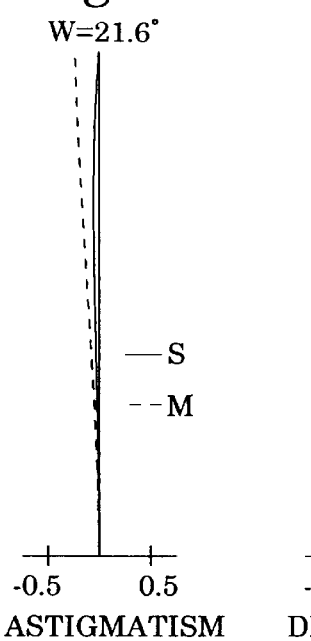
Figure 15D:
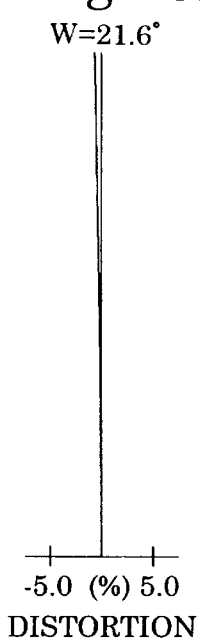
Figure 16A:
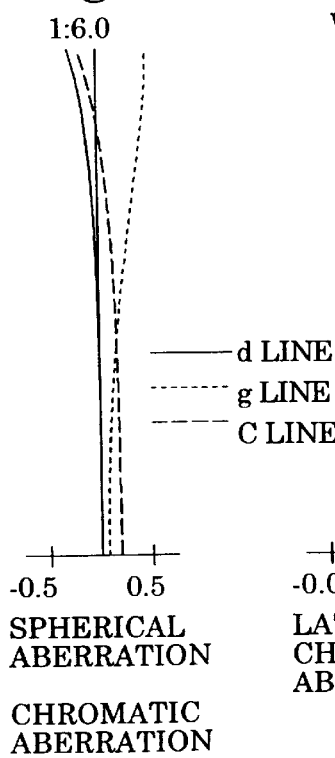
FIGS. 16A, 16B, 16C and 16D are aberration diagrams of the lens arrangement of FIG. 13 at the long focal length extremity.
Figure 16B:
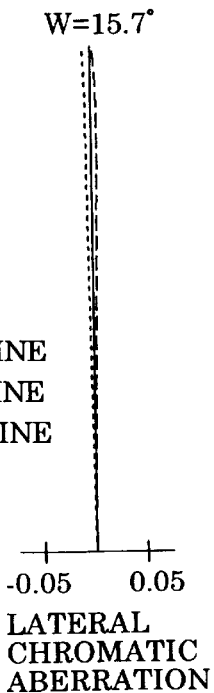
Figure 16C:
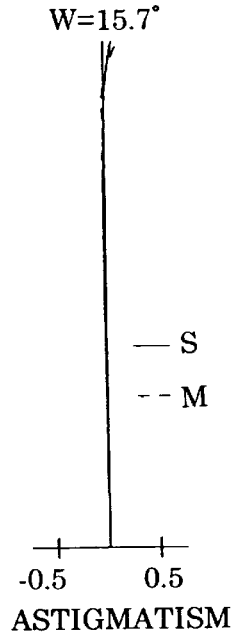
Figure 16D:
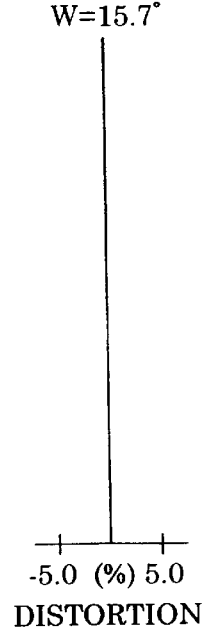

FIGS. 13 through 16D show the second embodiment of zoom lens system according to the present invention. FIG. 13 is a lens arrangement at the long focal length extremity; FIGS. 14A, 14B, 14C and 14D, FIGS. 15A, 15B, 15C and 15D and FIGS. 16A, 16B, 16C and 16D show aberration diagrams of the zoom lens system at the short focal-length extremity, a medium focal length position, and the long focal length extremity; Table 4 shows the numerical data thereof. The basic lens construction is the same as that of the first embodiment.

TABLE 4

$F_{NO} = 3.5–4.8–6.0$
$f = 29.00–55.00–77.10$ (zoom ratio: 2.66)
$W = 38.2° –21.6° –15.7°$
$f_B = 47.06–71.72–92.69$

| Surface No. | R | D | $N_d$ | $v_d$ |
|---|---|---|---|---|
| 1 | 89.365 | 3.54 | 1.64769 | 33.8 |
| 2 | 345.969 | 0.10 | — | — |
| 3 | 67.607 | 1.80 | 1.80610 | 40.9 |
| 4 | 18.877 | 6.94 | — | — |
| 5 | 421.221 | 1.60 | 1.69680 | 55.5 |
| 6 | 35.589 | 3.05 | — | — |
| 7 | 28.785 | 3.65 | 1.75520 | 27.5 |
| 8 | 69.654 | 37.01-12.74-4.99 | — | — |
| 9 | 42.461 | 3.60 | 1.60311 | 60.7 |
| 10 | −69.235 | 0.10 | — | — |
| 11 | 18.631 | 3.70 | 1.57501 | 41.5 |
| 12 | 70.667 | 1.36 | — | — |
| 13 | −176.921 | 7.00 | 1.78470 | 26.2 |
| 14 | 17.583 | 4.10 | — | — |
| 15 | 100.582 | 3.10 | 1.54072 | 47.2 |
| 16 | −31.343 | — | — | — |

Table 5 shows the numerical data for each condition of embodiments 1 through 4.

TABLE 5

|  | Emb. 1 | Emb. 2 | Emb. 3 | Emb. 4 |
|---|---|---|---|---|
| Cond. (1) | 1.248 | 1.248 | 1.290 | 1.318 |
| Cond. (2) | 1.55701 | 1.55701 | 1.55972 | 1.57295 |
| Cond. (3) | −0.706 | −0.702 | −0.726 | −0.732 |

As can be clearly understood from Table 5, the numerical values of embodiments 1 through 4 satisfy conditions (1) through (3); and moreover, as the aberration diagrams show, the various aberrations are satisfactorily corrected at each focal length thereof.

According to the present invention, a zoom lens system having a zoom ratio of about 2.7, the ratio of which can cover a zooming range from a wide-angle position with the half-angle-of-view of about 38° to the telephoto position, can be obtained; whereby the production cost of the zoom lens system can be reduced while optimum optical performance is obtained.

What is claimed is:

1. A zoom lens system consisting of a negative first lens group and a positive second lens group in this order from the object, each of said lens group being arranged to move for zooming;

said first negative lens group including a first lens element comprising a single positive lens element, a second lens element comprising a single negative meniscus lens element having the convex surface facing the object, a third lens element comprising a single negative lens element and a fourth lens element comprising a positive single lens element having a convex surface facing the object, in this order from the object;

said second positive lens group including a fifth lens element comprising a positive biconvex single lens element, a sixth lens element comprising a positive single meniscus lens element having the convex surface facing the object, a seventh lens element comprising a negative biconcave single lens element and an eighth lens element comprising a positive single lens element, in this order from the object side; and said zoom lens system satisfying the following relationship:

$$(n_2+n_3)/Z<1.32$$

wherein $n_i$ designates the refractive index of the i-th lens element; and

Z designates the zoom ratio of said zoom lens system.

2. A zoom lens system having a negative first lens group and a positive second lens group in this order from the object, each of said lens group being arranged to move for zooming;

said first negative lens group including a first lens element comprising a single positive lens element, a second lens element comprising a single negative meniscus lens element having the convex surface facing the object, a third lens element comprising a single negative lens element and a fourth lens element comprising a positive single lens element having a convex surface facing the object, in this order from the object;

said second positive lens group including a fifth lens element comprising a positive biconvex single lens element, a sixth lens element comprising a positive single meniscus lens element having the convex surface facing the object, a seventh lens element comprising a negative biconcave single lens element and an eighth lens element comprising a positive single lens element, in this order from the object side; and said zoom lens system satisfying the following relationships:

$$(n_2+n_3)/Z<1.32; \text{ and}$$

$$1.51<(n_5+n_6+n_8)/3<1.58$$

wherein $n_i$ designates the refractive index of the i-th lens element; and

Z designates the zoom ratio of said zoom lens system.

3. A zoom lens system having a negative first lens group and a positive second lens group in this order from the object, each of said lens group being arranged to move for zooming;

said first negative lens group including a first lens element comprising a single positive lens element, a second lens element comprising a single negative meniscus lens element having the convex surface facing the object, a third lens element comprising a single negative lens element and a fourth lens element comprising a positive single lens element having a convex surface facing the object, in this order from the object;

said second positive lens group including a fifth lens element comprising a positive biconvex single lens element, a sixth lens element comprising a positive single meniscus lens element having the convex surface facing the object, a seventh lens element comprising a negative biconcave single lens element and an eighth lens element comprising a positive single lens element, in this order from the object side; and said zoom lens system satisfying the following relationships:

$$(n_2+n_3)/Z<1.32; \text{ and}$$

$$-0.8<m_{2W}<-0.68;$$

wherein $m_{2W}$ designates the lateral magnification of said second lens group at the short focal length extremity;

$n_i$ designates the refractive index of the i-th lens element; and

Z designates the zoom ratio of said zoom lens system.

4. The zoom lens system according to claim 1, wherein said zoom lens system further satisfies the following relationship:

$$1.51<(n_5+n_6+n_8)/3<1.58.$$

5. The zoom lens system according to claim 1, wherein said zoom lens system further satisfies the following relationship:

$$-0.8<m_{2W}<-0.68$$

wherein $m_{2W}$ designates the lateral magnification of said second lens group at the short focal length extremity.

* * * * *